United States Patent
Fermaut et al.

(10) Patent No.: US 11,050,315 B2
(45) Date of Patent: Jun. 29, 2021

(54) ROTOR FOR A SYNCHRONOUS GENERATOR

(71) Applicant: GE Renewable Technologies, Grenoble (FR)

(72) Inventors: Jean-Marie Fermaut, Belford (FR); Wenli Liu, Birr (CH); Hugo Borgna, Birr (CH)

(73) Assignee: GE Renewable Technologies, Grenoble (FR)

( * ) Notice: Subject to any disclaimer, the term of this patent is extended or adjusted under 35 U.S.C. 154(b) by 48 days.

(21) Appl. No.: 16/526,304

(22) Filed: Jul. 30, 2019

(65) Prior Publication Data

US 2020/0044506 A1 Feb. 6, 2020

(30) Foreign Application Priority Data

Jul. 31, 2018 (EP) .................................... 18306041
Oct. 8, 2018 (EP) .................................... 18306327

(51) Int. Cl.
*H02K 3/28* (2006.01)
*H02K 19/12* (2006.01)
*H02K 1/24* (2006.01)

(52) U.S. Cl.
CPC ................. *H02K 3/28* (2013.01); *H02K 1/24* (2013.01); *H02K 19/12* (2013.01)

(58) Field of Classification Search
CPC ............ H02K 3/28; H02K 1/24; H02K 19/12; H02K 2203/09
See application file for complete search history.

(56) References Cited

U.S. PATENT DOCUMENTS

| 8,405,341 | B2 * | 3/2013 | Tagome | H02P 25/22 318/722 |
| 2011/0309725 | A1 * | 12/2011 | Sugiyama | H02K 3/522 310/68 R |
| 2014/0327331 | A1 * | 11/2014 | Hikita | H02K 3/345 310/71 |
| 2016/0294239 | A1 * | 10/2016 | Yamada | H02K 19/12 |

FOREIGN PATENT DOCUMENTS

| JP | S54 144102 U | 10/1979 |
| JP | S55 13622 A | 1/1980 |
| JP | S56 110755 U | 8/1981 |
| JP | S59 25931 U | 2/1984 |
| JP | H09 182340 A | 7/1997 |

OTHER PUBLICATIONS

EP 18306041 Search Report, dated Dec. 7, 2018.
EP 18306327 Search Report, dated Dec. 12, 2018.

* cited by examiner

*Primary Examiner* — Naishadh N Desai
(74) *Attorney, Agent, or Firm* — Dority & Manning, P.A.

(57) ABSTRACT

The invention concerns a rotor for a synchronous generator having a plurality of salient poles regularly disposed on the outer periphery of a rim, each pole comprising a coil with two external terminals said, respectively, first terminal and second terminal, the poles being arranged so that two adjacent poles have either their respective first terminals or their respective second terminals facing each other, the rotor further comprising at least a first connection between first terminals and/or at least a second connection between second terminals, the rotor being characterized in that the first connection and the second connection comprises a plurality of elongated conductive plates whose each ends (A, B) are secured via a single securing mean on facing terminals.

12 Claims, 6 Drawing Sheets

ROTOR FOR A SYNCHRONOUS GENERATOR

TECHNICAL FIELD

The invention relates to the rotor of a synchronous generator having a plurality of salient poles, each pole comprising a coil wounded around a pole core, connected together so that each pole is circulated by the same excitation current.

In particular, the present invention relates to apparatus for forming connections between poles having low sensitivity to mechanical and thermal stress generated during pole rotation.

Prior Art

In synchronous generators, the rotor is provided with salient poles, each pole comprising a coil wounded around a pole core, arranged on the outer periphery of a rim.

The function of the coils is to generate a magnetic field when they are circulated by an excitation current.

A close circuit is created by connecting the coils using connection means so that the same excitation current circulates within all the coils.

Such connection means 1, as depicted in FIG. 1, can be supported on the rim 2 of the rotor and connected on each side to two adjacent coil terminals 3. Such a configuration is generally intended to be implemented in high speed rotation synchronous generators.

This arrangement is however not satisfactory.

Indeed, during the rotor rotation, the poles are subjected to centrifugal forces that cause their relative displacement along a radial direction. These relative displacements induce local mechanical and thermal stress in the connection means, thus affecting their mechanical integrity, and ultimately causing their failure.

Besides, such connection means are quite heavy, which exacerbates the mechanical stress.

Alternatively, it has been proposed, in particular, for low rotation speed synchronous generators, connection means not supported by the rim and only attached to the terminals of adjacent coils (illustrated in FIG. 2).

Such connection means generally comprise a metallic plate 1 attached on its both ends to terminals 3 by a plurality of bolts.

However, such a configuration is not satisfactory either.

Indeed, the relatively high stiffness of the attachment of the connection means renders them quite sensitive to pole displacements along the longitudinal direction which occur when the rotor is rotating.

It is then an object of the invention to propose a rotor with connection means less sensitive to the mechanical and thermal stress that could occur when the rotor is rotating.

SUMMARY OF THE INVENTION

The aforementioned aim is achieved by a rotor for a synchronous generator having a plurality of salient poles regularly disposed on the outer periphery of a rim and spaced by spaces called pole interspaces, each pole comprising a coil with two external terminals called, respectively, first terminal and second terminal, the poles being arranged so that two adjacent poles have either their respective first terminals or their respective second terminals facing each other, the rotor further comprises at least a first connection between facing first terminals and/or at least a second connection between facing second terminals.

The rotor is characterized in that at least one of the first connection and the second connection comprises a plurality of elongated conductive plates preferably not supported by the rim. Each of the ends of the elongated conductive plates are secured, respectively, with a single securing means, to one and the other terminal of facing first or second terminals.

According to one embodiment, at least one of the first connection and the second connection is flexible. Preferably, at least one of the plurality of elongate plates is flexible. The flexibility enables the connections to flex to accommodate for the changes in position of the adjacent poles when the generator is in use.

According to one embodiment, at least one of the first connection and the second connection is resilient. Preferably, at least one of the plurality of elongate plates is resilient. When the conditions of the generator changes, for example, when the generator is not in use, the connections are resilient so that they are not permanently deformed due to the movement of the poles.

The securing means may be engaged through two cooperating holes made on the end of the considered elongated conductive plate and on the terminal to which said end is secured.

According to one embodiment, at least one of the first connection and the second connection is flexible.

According to one embodiment, at least one of the first connection and the second connection is resilient.

According to one embodiment, each securing mean comprises a single bolt.

According to one embodiment, external terminals emerge in the pole interspace.

According to one embodiment, the external terminals are bent or folded so as to impose a convex shape to the elongated conductive plates.

According to one embodiment, the elongated conductive plates comprise a central section and secured ends, the central section having a reduced width with respect to width of the secured ends.

According to one embodiment, two facing second terminals, said powered terminals, are connected to an excitation current supply.

According to one embodiment, adjacent salient poles have opposite magnetic polarities.

According to one embodiment, each elongated conductive plate is made of a metal, advantageously the metal comprises copper or aluminum.

The invention also concerns a synchronous generator comprising a rotor according to the invention.

BRIEF DESCRIPTION OF THE FIGURES

Other characteristics and advantages will emerge in the description that follows of the embodiments of the rotor for a synchronous generator according to the invention, given as non-restrictive examples, with reference to the appended illustrations wherein.

DETAILED DISCLOSURE OF EMBODIMENTS

Figure 1:
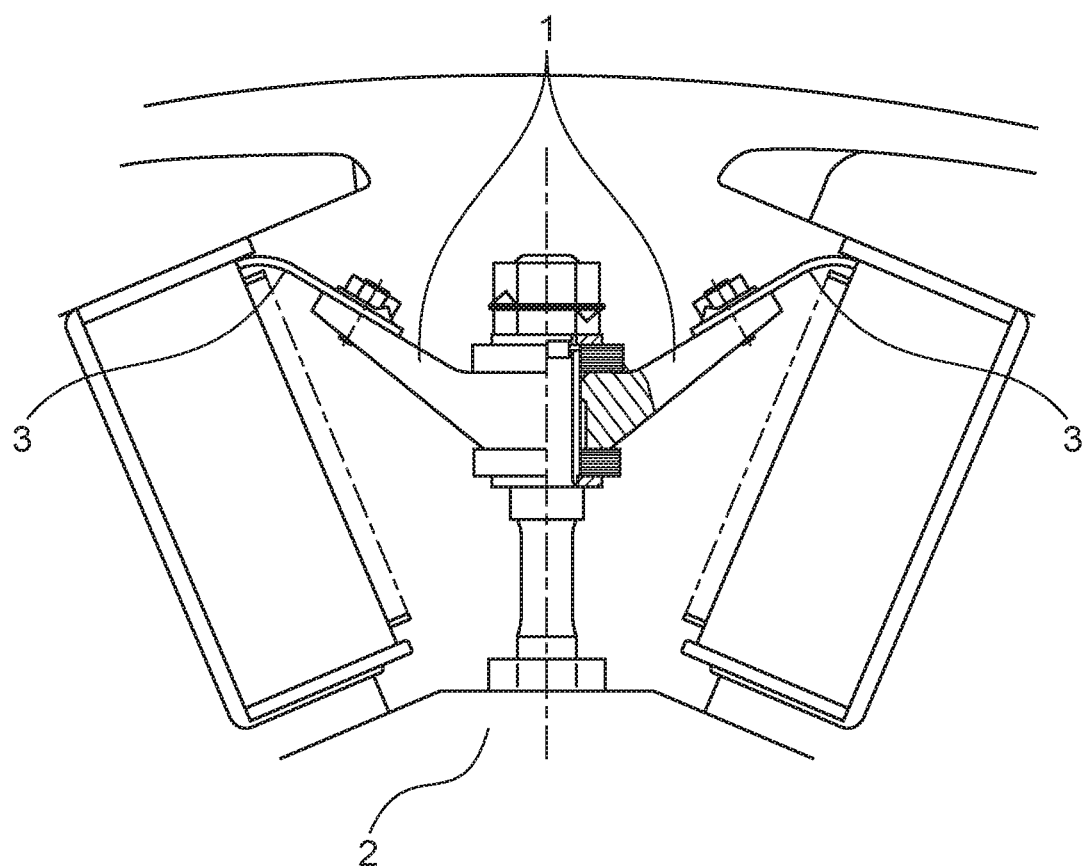
FIG. 1 is a schematic representation of connection means supported on the rim for a high rotation speed rotor known in the state of the art.
Figure 2:
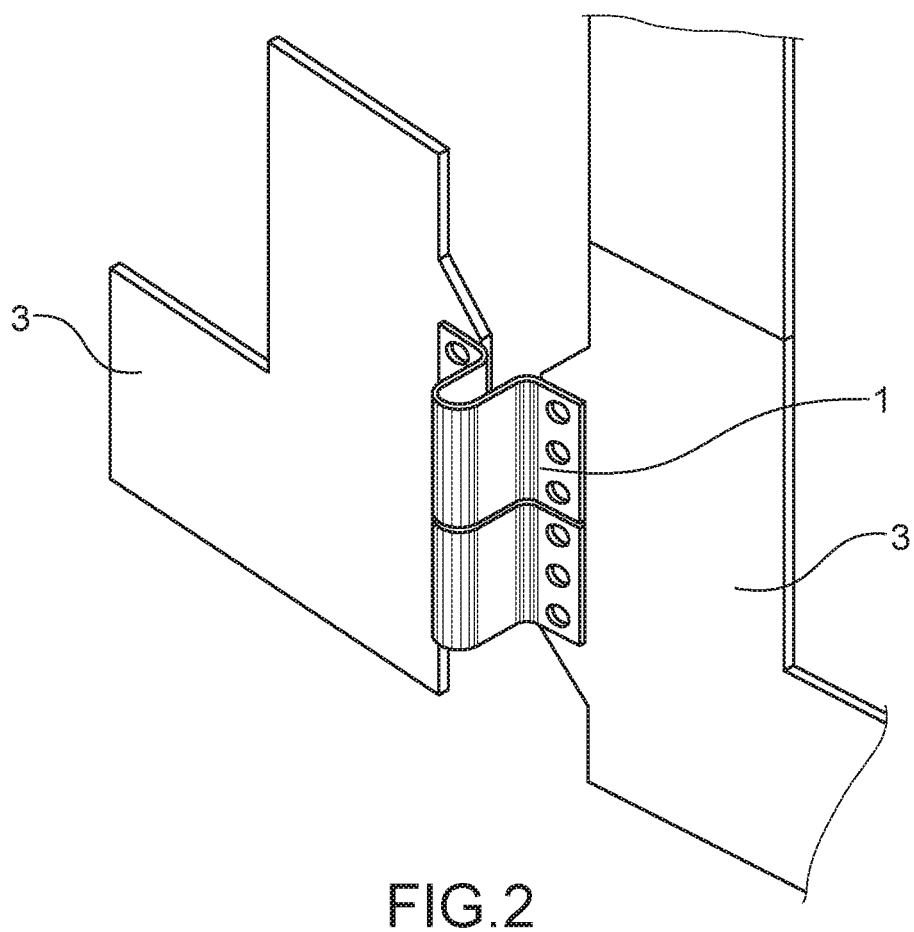
FIG. 2 is a schematic representation of connection means for a low rotation speed rotor known in the state of the art.
Figure 3:
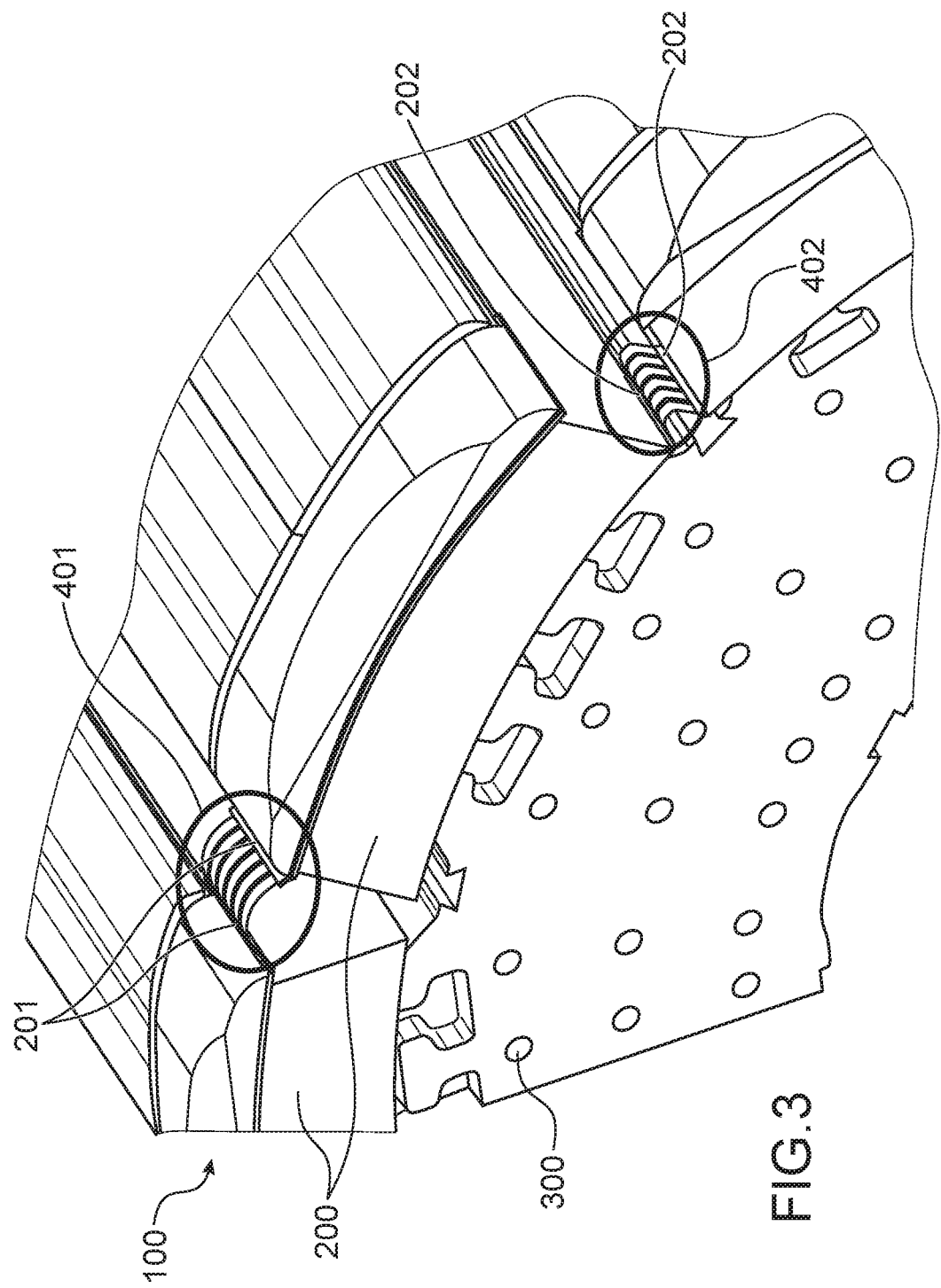
FIG. 3 is a schematic representation of a section of a rotor according to the present invention.
Figure 4:
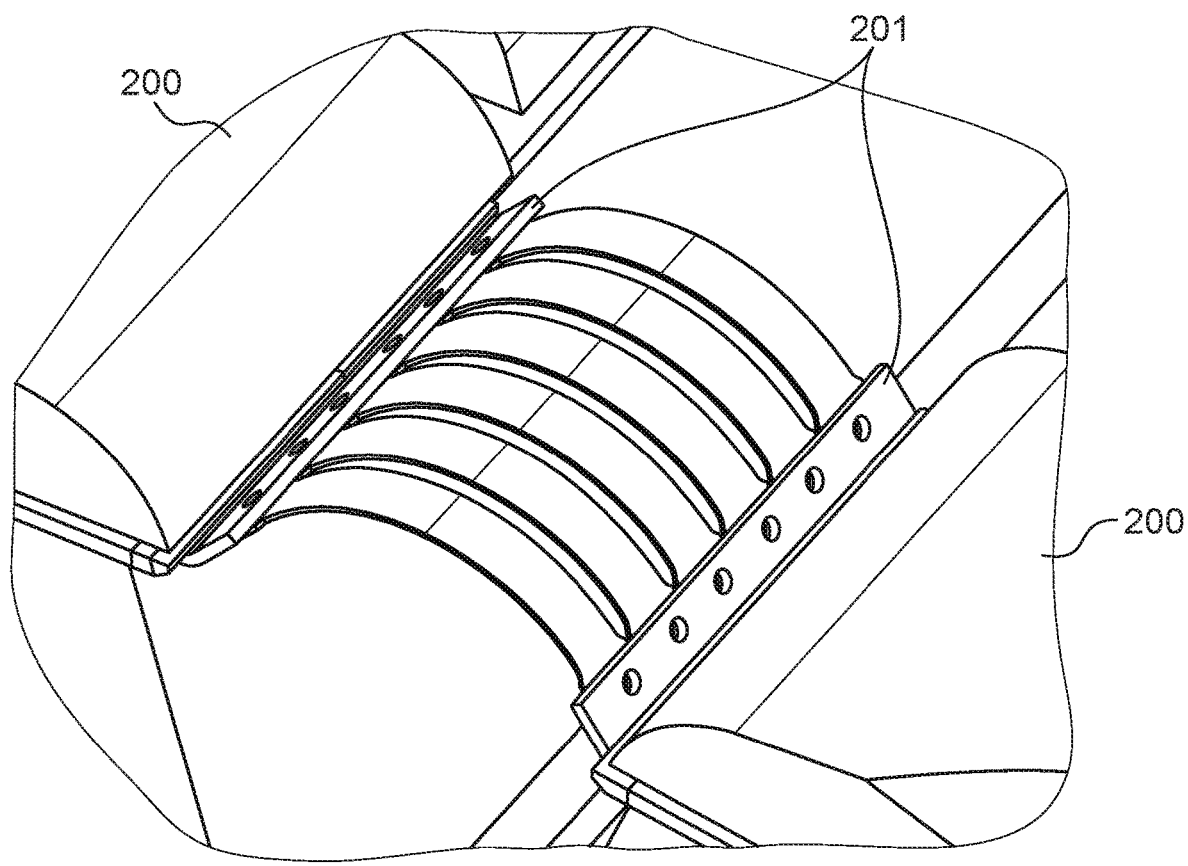
FIG. 4 is a schematic representation of the first connection according to the present invention.

FIG. 3 represents a rotor 100 for a synchronous generator according to the present invention.

In particular, the rotor 100 comprises a plurality of salient poles 200 regularly disposed on the outer periphery of a rim 300.

Each salient pole 200 comprises a coil which, when circulated by an excitation current, produces a magnetic field.

Each coil comprises two external terminals said, respectively, first terminal 201 (FIG. 3, 4, 5, 6) and second terminal 202 (FIG. 3).

In particular, two adjacent poles 200 are arranged to have either their respective first terminals 201 or their respective second terminals 202 facing each other.

In other words, two adjacent salient poles 200 are arranged to have opposite polarities.

Advantageously, external terminals emerge from poles in a pole interspace.

The rotor 100 according to the present invention further comprises at least a first connection 401 between first terminals 201 and/or at least a second connection 402 between second terminals 202 (FIG. 3).

The first connection and the second connection comprise a plurality of elongated conductive plates, advantageously not supported by the rim.

In particular, each elongated conductive plate comprises a central section C and two ends A and B, each which are secured, with a securing means, respectively, to one and the other terminal of facing terminals.

The first connection and/or the second connection may be flexible.

By "flexible", it is meant the connections can overcome some deformation when a force stemming from the rotor rotation is applied to them. In particular, it is meant connections having dimensions and/or mechanical properties (for example the Young Modulus) adjusted so that no breaking occurs when a force stemming from rotor rotation is applied to them.

The skilled person with his general knowledge is able to choose the most appropriate materials and dimensions for providing flexible first and or second connections compatible for their implementation in the context of the present invention.

Advantageously, the first connection and/or second connection may be resilient.

By "resilient", it is meant the connections can overcome some deformation, but limited to elastic deformation, when a force stemming from the rotor rotation is applied to them. In particular, it is meant connections having dimensions and/or mechanical properties (for example the Young Modulus) adjusted so that no breaking occurs when a force stemming from rotor rotation is applied to them.

The skilled person with his general knowledge is able to choose the most appropriate materials and dimensions for providing resilient connections compatible for their implementation in the context of the present invention.

The securing means can, advantageously, be engaged through two cooperating holes made on the end of the considered elongated conductive plate and on the terminal to which said end is secured.

Figure 6:
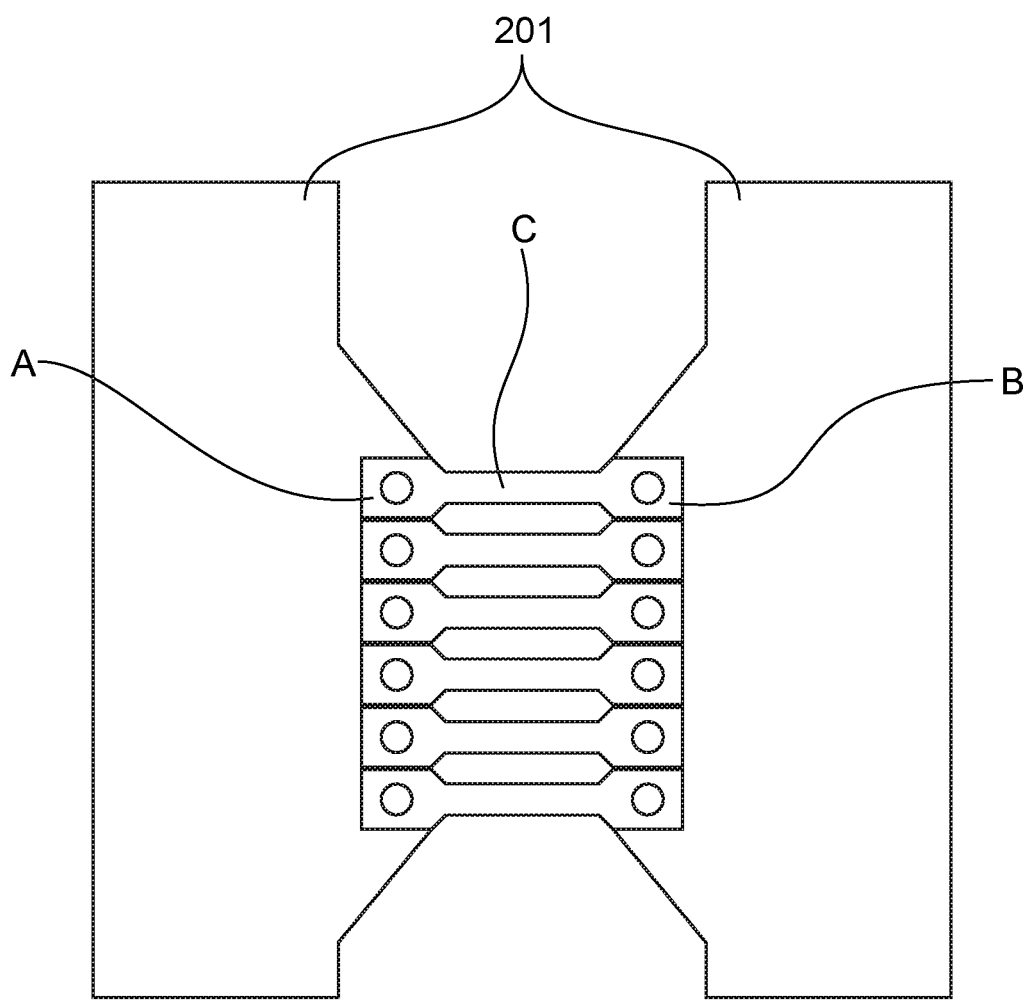
FIG. 6 is a top view of the first connection of FIG. 4.

For example, the securing mean can comprise, but not limited to, a bolt/nut assembly, a screw, a rivet (FIG. 6).

Advantageously, each elongated conductive plate is made of a metal. For example, the metal comprises copper or aluminum.

The consideration of a single securing mean, for example a single bolt, per end for attaching the elongated conductive plate to two facing terminals improves the flexibility of the connection which is therefore less sensitive to salient poles displacement.

Furthermore, the fact that the connection between facing terminals is ensured by a plurality of elongated conductive plates globally reduces the effect of the mass of said connection, and, as a consequence, the sensitivity to a stress induced by the rotation of the rotor.

Figure 5:
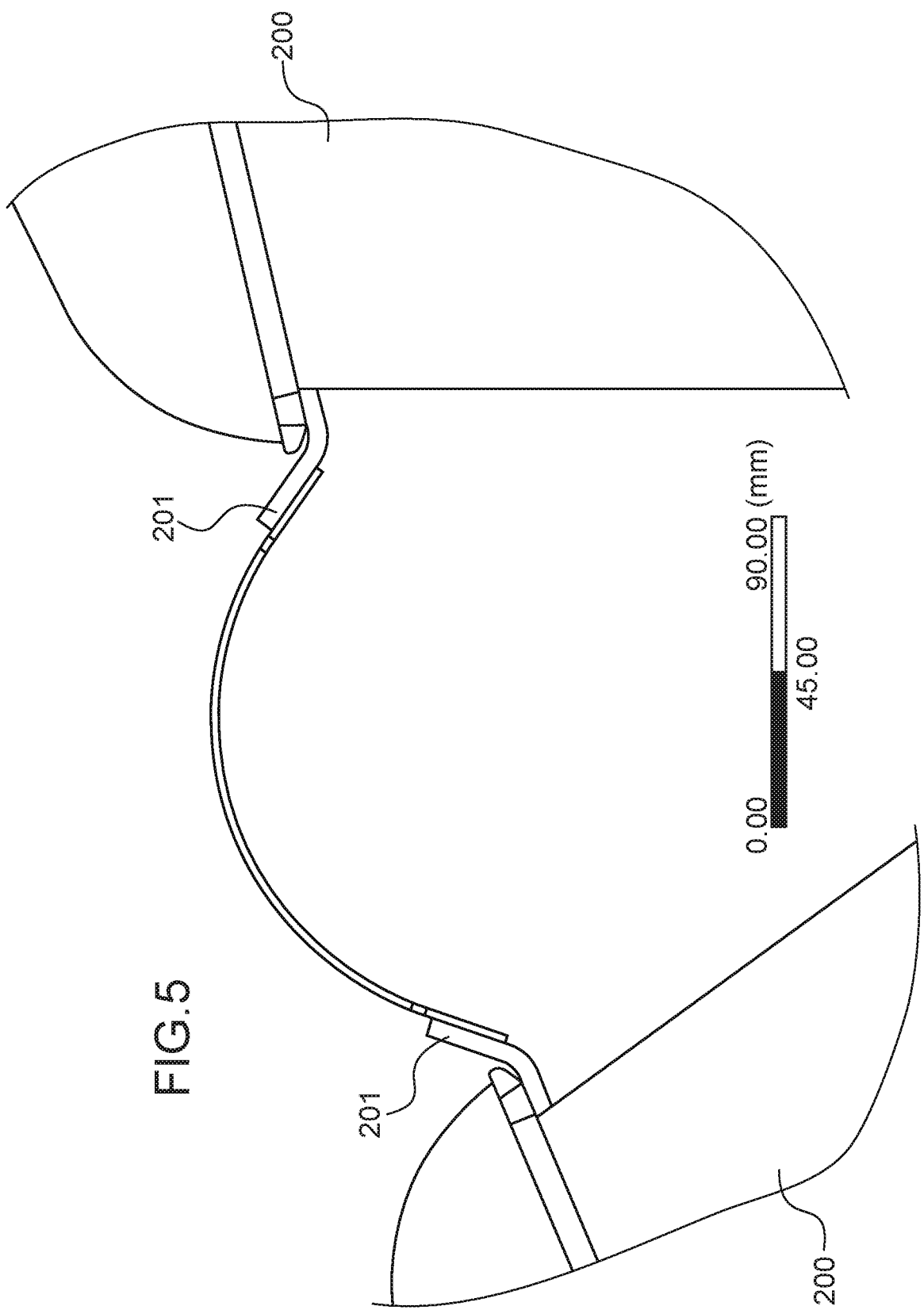
FIG. 5 is a cross section of the schematic representation of the first connection of FIG. 4.

In a particular embodiment, the external terminals are bent or folded so as to impose a convex shape to the elongated conductive plates (FIG. 5). This configuration further improves the flexibility of the connection means and as a consequence reduces their sensitivity to the relative displacement of the salient poles.

Advantageously, the central section C of the elongated conductive plates has a reduced width with respect to the ends A and B.

This reduced width makes it possible to create ventilation spaces between the elongated conductive plates. This ventilation limits the temperature increase due to the heating occurring during rotation of the rotor.

The rotor can further comprise a current supply connected to two second terminals 202, said powered terminals.

The invention also concerns a synchronous generator, in particular a synchronous hydrogenerator, which comprises the rotor according to the present invention.

The invention claimed is:

1. Rotor for a synchronous generator having a plurality of salient poles regularly disposed on the outer periphery of a rim and spaced by spaces called pole interspaces, each pole comprising a coil with two external terminals called, respectively, first terminal and second terminal, the poles being arranged so that two adjacent poles have either their respective first terminals or their respective second terminals facing each other, the rotor further comprises one or both of a first connection between facing first terminals or a second connection between facing second terminals, and
    wherein at least one of the first connection or the second connection comprises a plurality of elongated conductive plates, each conducting plate having opposite ends secured with a single securing means to the facing first or second terminals.

2. Rotor according to claim 1, wherein at least one of the first connection and the second connection is flexible.

3. Rotor according to claim 1, wherein at least one of the first connection and the second connection is resilient.

4. Rotor according to claim 1, wherein the single securing means are engaged through a respective hole made on the end of the elongated conductive plate and on the first or second terminal to which the end is secured.

5. Rotor according to claim 1, wherein each securing means comprises a single bolt.

6. Rotor according to claim 1, wherein external terminals emerge in the pole interspace.

7. Rotor according to claim 1, wherein the external terminals are bent or folded so as to impose a convex shape to the elongated conductive plates.

8. Rotor according to claim 1, wherein the elongated conductive plates comprise a central section having a reduced width with respect to a width of the ends of the conductive plates.

9. Rotor according to claim 1, wherein the two facing second terminals are powered terminals connected to an excitation current supply.

10. Rotor according to claim 1, wherein adjacent salient poles have opposite magnetic polarities.

11. Rotor according to claim 1, wherein each elongated conductive plate is made of a metal.

12. A synchronous generator comprising a rotor according to claim 1.

* * * * *